United States Patent
Joo

(10) Patent No.: US 12,451,202 B2
(45) Date of Patent: Oct. 21, 2025

(54) MEMORY DEVICE WITH SUB-PROCESSOR FOR PARALLEL CONTROL OF PROGRAM VOLTAGE AND PASS/FAIL CHECK AND METHOD OF OPERATING THE SAME

(71) Applicant: SK hynix Inc., Gyeonggi-do (KR)

(72) Inventor: Byoung In Joo, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 252 days.

(21) Appl. No.: 18/320,200

(22) Filed: May 19, 2023

(65) Prior Publication Data

US 2024/0185932 A1 Jun. 6, 2024

(30) Foreign Application Priority Data

Dec. 2, 2022 (KR) .................. 10-2022-0167018

(51) Int. Cl.
*G11C 16/34* (2006.01)
*G11C 16/12* (2006.01)
*G11C 16/24* (2006.01)

(52) U.S. Cl.
CPC .......... *G11C 16/3459* (2013.01); *G11C 16/12* (2013.01); *G11C 16/24* (2013.01)

(58) Field of Classification Search
CPC ..... G11C 16/3459; G11C 16/12; G11C 16/24; G11C 11/5628; G11C 16/0483; G11C 16/10; G11C 16/08; G11C 16/34; G11C 16/26
See application file for complete search history.

(56) References Cited

U.S. PATENT DOCUMENTS

2021/0005265 A1* 1/2021 Lee .................. G11C 16/3468
2021/0279169 A1* 9/2021 Zhang ................ G06F 9/44505

FOREIGN PATENT DOCUMENTS

KR 10-1596222 B1 2/2016
KR 10-1802815 B1 12/2017

OTHER PUBLICATIONS

L. Nubile, L. De Santis and R. Cardinali, "Multi-Threaded control of NAND Flash memory array," 2021 IEEE Workshop on Microelectronics and Electron Devices (WMED), Boise, ID, USA, 2021, pp. 1-4 (Year: 2021).*
Nubil, et al, "Multi-Threaded control of NAND Flash memory array," 2021 IEEE Workshop on Microelectronics and Electron Devices (WMED), Boise, ID, USA, 2021 (Year: 2021).*

* cited by examiner

*Primary Examiner* — Amir Zarabian
*Assistant Examiner* — Bradley S Coon
(74) *Attorney, Agent, or Firm* — IP & T GROUP LLP

(57) ABSTRACT

Provided herein is a memory device and a method of operating the same. The memory device includes memory cells coupled between a word line and bit lines, a main processor configured to control program-related voltages that are applied to the word line and the bit lines, a page buffer configured to store data sensed based on threshold voltages of the memory cells, a sensing circuit configured to perform a pass/fail check operation of comparing a sensing current corresponding to the sensed data with a reference current, and a sub-processor configured to control the page buffer and the sensing circuit to perform the pass/fail check operation in parallel with control of the program-related voltages while the main processor controls the program-related voltages.

19 Claims, 8 Drawing Sheets

MEMORY DEVICE WITH SUB-PROCESSOR FOR PARALLEL CONTROL OF PROGRAM VOLTAGE AND PASS/FAIL CHECK AND METHOD OF OPERATING THE SAME

CROSS-REFERENCE TO RELATED APPLICATION

The present application claims priority under 35 U.S.C. § 119 (a) to Korean patent application number 10-2022-0167018 filed on Dec. 2, 2022, the entire disclosure of which is incorporated by reference herein.

BACKGROUND

1. Field of Invention

Various embodiments of the present disclosure relate to an electronic device, and more particularly to a memory device and a method of operating the memory device.

2. Description of Related Art

A memory system may store data under the control of a host device such as a computer or a smartphone. The memory system may include a memory device in which data is stored and a memory controller which controls the memory device. Memory devices are classified into a volatile memory device and a nonvolatile memory device.

The nonvolatile memory device may be a memory device in which stored data is retained even when the supply of power is interrupted. Examples of the nonvolatile memory device may include a read only memory (ROM), a programmable ROM (PROM), an electrically programmable ROM (EPROM), an electrically erasable and programmable ROM (EEPROM), and a flash memory.

The nonvolatile memory device may perform a program operation of storing data. The program operation may include a program voltage apply operation of increasing the threshold voltages of memory cells included in the nonvolatile memory device and a verify operation of identifying the threshold voltages of the memory cells. When the threshold voltages of the memory cells are not increased to threshold voltages corresponding to data to be stored in the memory cells, the program voltage apply operation and the verify operation may be repeatedly performed. When the program voltage apply operation and the verify operation are sequentially performed until the threshold voltages of the memory cells are increased to threshold voltages corresponding to the data to be stored in the memory cells, the time required for the program operation may be lengthened.

SUMMARY

Various embodiments of the present disclosure are directed to a memory device that is capable of reducing the time required to perform a program operation and a method of operating the memory device.

An embodiment of the present disclosure may provide a memory device. The memory device may include memory cells coupled between a word line and bit lines, a main processor configured to control program-related voltages that are applied to the word line and the bit lines, a page buffer configured to store data sensed based on threshold voltages of the memory cells, a sensing circuit configured to perform a pass/fail check operation of comparing a sensing current corresponding to the sensed data with a reference current, and a sub-processor configured to control the page buffer and the sensing circuit to perform the pass/fail check operation in parallel with control of the program-related voltages while the main processor controls the program-related voltages.

An embodiment of the present disclosure may provide a memory device. The memory device may include memory cells coupled between a word line and bit lines, a peripheral circuit configured to perform a program operation of increasing threshold voltages of the memory cells, a main processor configured to control, during the program operation, the peripheral circuit to apply program-related voltages to the word line and the bit lines, and a sub-processor configured to control the peripheral circuit to perform a pass/fail check operation of comparing a number of on-cells with a reference number of on-cells in parallel with application of the program-related voltages while the program-related voltages are applied to the word line and the bit lines, the number of on-cells is identified by a verify operation, among the memory cells.

An embodiment of the present disclosure may provide a method of operating a memory device. The method may include performing a program pulse operation of applying a program voltage to a word line coupled to memory cells, performing a discharge operation of applying a ground voltage to the word line and bit lines coupled to the memory cells, and performing, by a sub-processor, a pass/fail check operation of comparing a number of on-cells identified by a verify operation, among the memory cells, with a reference number of on-cells in parallel with the program pulse operation and the discharge operation while the program pulse operation and the discharge operation are performed by a main processor.

An embodiment of the present disclosure may provide a memory device. The memory device may include a plurality of memory cells arranged between a word line and multiple bit lines, a peripheral circuit including a voltage generator configured to generate a precharge voltage, a program voltage and a ground voltage, a page buffer coupled to the memory cells and a sensing circuit coupled to the page buffer, a main processor configured to control the voltage generator to provide the precharge voltage to the bit lines during a first period, to provide the program voltage to the word line during a second period following the first period, and to provide the ground voltage to the word line and the bit lines during a third period following the second period, and a sub-processor configured to control, during the second and third periods, the page buffer to store data programmed in the memory cells, control the sensing circuit to sense a current corresponding to the stored data, and determine pass or fail of the data programmed in the memory cells based on the sensed current.

DETAILED DESCRIPTION

Specific structural or functional descriptions of the embodiments of the present disclosure introduced in this specification are provided as examples to describe embodiments according to the concept of the present disclosure. The embodiments according to the concept of the present disclosure may be practiced in various forms, and should not be construed as being limited to the embodiments described in the specification.

Figure 1:
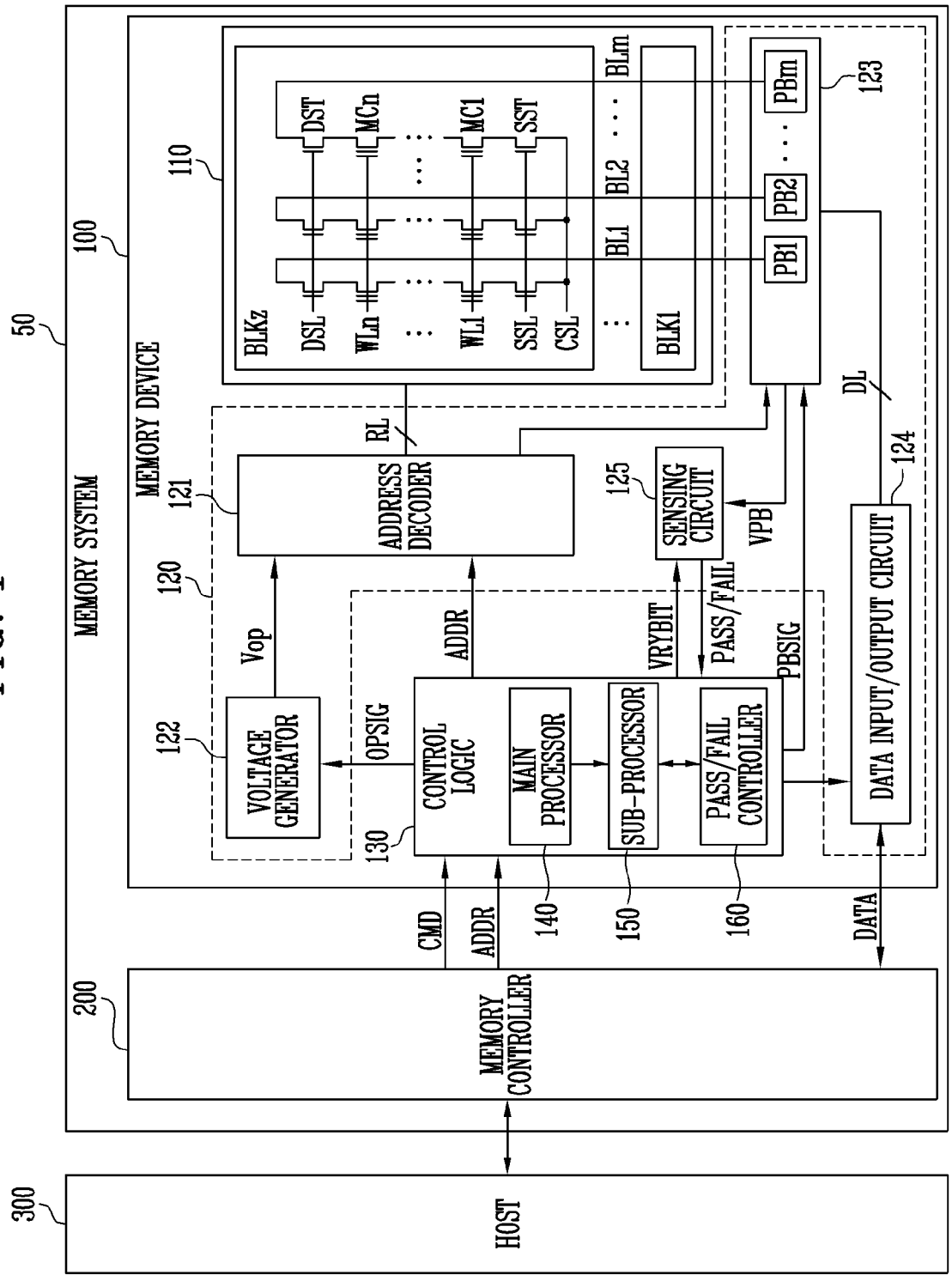
FIG. 1 is a diagram illustrating a memory system including a memory device according to an embodiment of the present disclosure.

FIG. 1 is a diagram illustrating a memory system 50 including a memory device according to an embodiment of the present disclosure.

Referring to FIG. 1, the memory system 50 may include a memory device 100 and a memory controller 200. The memory system 50 may be a device in which data is stored, under the control of a host 300, such as a mobile phone, a computer, or an in-vehicle infotainment system.

The memory system 50 may be manufactured as any of various types of storage devices such as a solid state drive (SSD) and a universal flash storage (UFS) depending on a host interface that is a scheme for communication with the host 300.

The memory system 50 may be manufactured in any of various types of package forms such as a system-on-chip (SoC).

The memory device 100 may store data. The memory device 100 may be operated under the control of the memory controller 200. In an embodiment, the memory device 100 may be a nonvolatile memory device or a volatile memory device.

The memory device 100 may receive commands CMD and addresses ADDR from the memory controller 200, and may access an area selected by each address ADDR. The memory device 100 may perform an operation indicated by each command CMD on the area selected by the corresponding address ADDR. The memory device 100 may perform a program operation (write operation) of storing data in the area selected by the address ADDR, a read operation of reading data, or an erase operation of erasing data.

In an embodiment, the memory device 100 may include a memory cell array 110, a peripheral circuit 120, and a control logic 130.

The memory cell array 110 may include a plurality of memory blocks BLK1 to BLKz. The plurality of memory blocks BLK1 to BLKz may be coupled to an address decoder 121 through row lines RL. The plurality of memory blocks BLK1 to BLKz may be coupled to a page buffer group 123 through bit lines BL1 to BLm. Each of the memory blocks BLK1 to BLKz may include a plurality of memory cells.

In an embodiment, a memory block BLKz, among the plurality of memory blocks BLK1 to BLKz, may include a plurality of word lines WL1 to WLn arranged in parallel between a drain select line DSL and a source select line SSL. The memory block BLKz may include a plurality of memory cell strings coupled between a bit line among the bit lines BL1 to BLm and a common source line CSL. The bit lines BL1 to BLm may be coupled to the plurality of memory cell strings, respectively, and the common source line CSL may be coupled in common to the plurality of memory cell strings.

For example, the memory cell string may include a drain select transistor DST, a plurality of memory cells MC1 to MCn, and a source select transistor SST, which are coupled in series to each other between the common source line CSL and the first bit line BL1. One memory cell string may include at least one drain select transistor DST and at least one source select transistor SST.

A drain of the drain select transistor DST may be coupled to the first bit line BL1, and a source of the source select transistor SST may be coupled to the common source line CSL. The plurality of memory cells MC1 to MCn may be coupled in series between the drain select transistor DST and the source select transistor SST. Gates of the source select transistors SST included in different memory cell strings may be coupled to the source select line SSL, gates of the drain select transistors DST included in different memory cell strings ST may be coupled to the drain select line DSL, and gates of the memory cells MC1 to MCn may be coupled to the plurality of word lines WL1 to WLn, respectively. Memory cells coupled to the same word line, among the memory cells included in different memory cell strings, may be defined as a 'physical page (PG)'. The physical page may be the unit by which data is stored. The memory block BLKz may include a number of physical pages identical to the number of word lines WL1 to WLn.

Each of the memory cells MC1 to MCn may be implemented as a single-level cell (SLC) capable of storing one bit of data, a multi-level cell (MLC) capable of storing two bits of data, a triple-level cell (TLC) capable of storing three bits of data, a quad-level cell (QLC) capable of storing four bits of data, or a memory cell capable of storing five or more bits of data.

The peripheral circuit 120 may drive the memory cell array 110. In an example, the peripheral circuit 120 may drive the memory cell array 110 to perform a program operation, a read operation, and an erase operation under the control of the control logic 130. In an example, the peripheral circuit 120 may apply various operating voltages to the row lines RL and the bit lines BL1 to BLm or discharge the applied voltages under the control of the control logic 130.

The peripheral circuit 120 may include the address decoder 121, a voltage generator 122, the page buffer group 123, a data input/output circuit 124, and a sensing circuit 125.

The address decoder 121 may be coupled to the memory cell array 110 through the row lines RL. The row lines RL may include drain select lines DSL, the plurality of word lines WL1 to WLn, source select lines SSL, and the common source line CSL.

The address decoder 121 may be operated under the control of the control logic 130. The address decoder 121 may receive addresses ADDR from the control logic 130.

The address decoder 121 may decode a block address, among the received addresses ADDR. The address decoder 121 may select at least one of the memory blocks BLK1 to BLKz according to the decoded block address. The address decoder 121 may decode a row address, among the received addresses ADDR. The address decoder 121 may select at least one word line WL of the selected memory block by applying voltages supplied from the voltage generator 122 to the at least one word line WL according to the decoded row address.

During a program operation, the address decoder 121 may apply a program voltage to the selected word line and apply a pass voltage having a level less than that of the program voltage to unselected word lines. During a program verify operation, the address decoder 121 may apply a verify voltage to the selected word line and apply a verify pass voltage having a level greater than that of the verify voltage to the unselected word lines.

The address decoder 121 may decode a column address among the received addresses ADDR. The decoded column address may be transferred to the page buffer group 123. In an embodiment, the address decoder 121 may include components such as a row decoder, a column decoder, and an address buffer.

The voltage generator 122 may generate a plurality of operating voltages Vop using an external supply voltage that is supplied to the memory device 100. The voltage generator 122 may be operated under the control of the control logic 130.

In an embodiment, the voltage generator 122 may generate various operating voltages Vop that are used for program, read, and erase operations in response to an operation signal OPSIG. For example, the voltage generator 122 may generate a plurality of erase voltages, a plurality of program voltages, a plurality of pass voltages, a plurality of select read voltages, and a plurality of unselect read voltages.

The generated operating voltages Vop may be supplied to the memory cell array 110 by the address decoder 121.

The page buffer group 123 may include first to m-th page buffers PB1 to PBm. The first to m-th page buffers PB1 to PBm may be coupled to the memory cell array 110 through the first to m-th bit lines BL1 to BLm, respectively. The first to m-th page buffers PB1 to PBm may be operated under the control of the control logic 130.

The first to m-th page buffers PB1 to PBm may transmit/receive data DATA to/from the data input/output circuit 124. During a program operation, the first to m-th page buffers PB1 to PBm may receive data DATA to be stored through the data input/output circuit 124 and data lines DL.

During a program operation, the first to m-th page buffers PB1 to PBm may transfer data DATA, received through the data input/output circuit 124, to selected memory cells through the bit lines BL1 to BLm. The memory cells in the selected page may be programmed based on the received data DATA. Memory cells coupled to a bit line to which a program-enable voltage (e.g., a ground voltage) is applied may have increased threshold voltages. The threshold voltages of memory cells coupled to a bit line to which a program-inhibit voltage (e.g., a supply voltage) is applied may be maintained. During a verify operation, the first to m-th page buffers PB1 to PBm may read the data DATA stored in the selected memory cells from the selected memory cells through the bit lines BL1 to BLm.

The data input/output circuit 124 may be coupled to the first to m-th page buffers PB1 to PBm through the data lines DL. The data input/output circuit 124 may be operated under the control of the control logic 130.

The data input/output circuit 124 may include a plurality of input/output buffers (not illustrated) which receive input data DATA. During a program operation, the data input/output circuit 124 may receive the data DATA to be stored from the memory controller 200.

During a read operation or a verify operation, the sensing circuit 125 may generate a reference current in response to an enable bit signal VRYBIT generated by the control logic 130, and may output a pass signal or a fail signal to the control logic 130 by comparing a sensing current VPB received from the page buffer group 123 with the reference current. In an example, the sensing circuit 125 may output a fail signal to the control logic 130 when the magnitude of the sensing current VPB is greater than that of the reference current. In an example, the sensing circuit 125 may output a pass signal to the control logic 130 when the magnitude of the sensing current VPB is less than that of the reference current.

The control logic 130 may be coupled to the address decoder 121, the voltage generator 122, the page buffer group 123, the data input/output circuit 124, and the sensing circuit 125. The control logic 130 may control the overall operation of the memory device 100. The control logic 130 may be operated in response to the commands CMD received from the memory controller 200.

The control logic 130 may control the peripheral circuit 120 by generating various types of signals in response to the commands CMD and the addresses ADDR. For example, the control logic 130 may generate the operation signal OPSIG, the addresses ADDR, a page buffer control signal PBSIG, and the enable bit VRYBIT in response to the commands CMD and the addresses ADDR. The control logic 130 may output the operation signal OPSIG to the voltage generator 122, may output the addresses ADDR to the address decoder 121, may output the page buffer control signal PBSIG to the page buffer group 123, and may output the enable bit signal VRYBIT to the sensing circuit 125. In addition, the control logic 130 may determine whether a verify operation has passed or failed in response to the pass or fail signal PASS or FAIL output from the sensing circuit 125.

In an embodiment, the control logic 130 may include a main processor 140, a sub-processor 150, and a pass/fail controller 160.

The main processor 140 and the sub-processor 150 may control a program operation on memory cells.

In an embodiment, during the program operation, the main processor 140 may control program-related voltages that are applied to a word line and bit lines coupled to memory cells. The program-related voltages applied to the word line may include a program voltage, a verify voltage, a pass voltage, and a ground voltage. The program-related voltages applied to the bit lines may include a program-enable voltage and a program-inhibit voltage.

In an embodiment, the sub-processor 150 may control the program operation under the control of the main processor 140. The sub-processor 150 may control the peripheral circuit 120 to perform a pass/fail check operation in response to a control signal output from the main processor 140. The pass/fail check operation may be an operation of determining the result of a verify operation based on data sensed by the verify operation. While the main processor 140 controls program-related voltages applied to the word line and bit lines, the sub-processor 150 may control the pass/fail check operation in parallel with the control of the program-related voltages.

The pass/fail controller 160 may receive pass/fail result information indicating the result of performing the pass/fail check operation from the sensing circuit 125. The pass/fail controller 160 may provide the pass/fail result information to the sub-processor 150.

The memory controller 200 may control the overall operation of the memory system 50.

The memory controller 200 may control the memory device 100 to perform a write operation, a read operation or an erase operation in response to a request received from the host 300. The memory controller 200 may provide commands CMD, addresses ADDR, or data DATA to the memory device 100 based on the write operation, the read operation or the erase operation.

In an embodiment, the memory controller 200 may internally generate a command, an address, and data regardless of whether a request from the host 300 is received, and may transmit them to the memory device 100. For example, the memory controller 200 may provide the memory device 100 with commands CMD, addresses ADDR, and data DATA required in order to perform read operations and write operations that are involved in performing wear leveling, read reclaim, garbage collection, etc.

The host 300 may communicate with the memory system 50 using at least one of various communication schemes.

Figure 2:
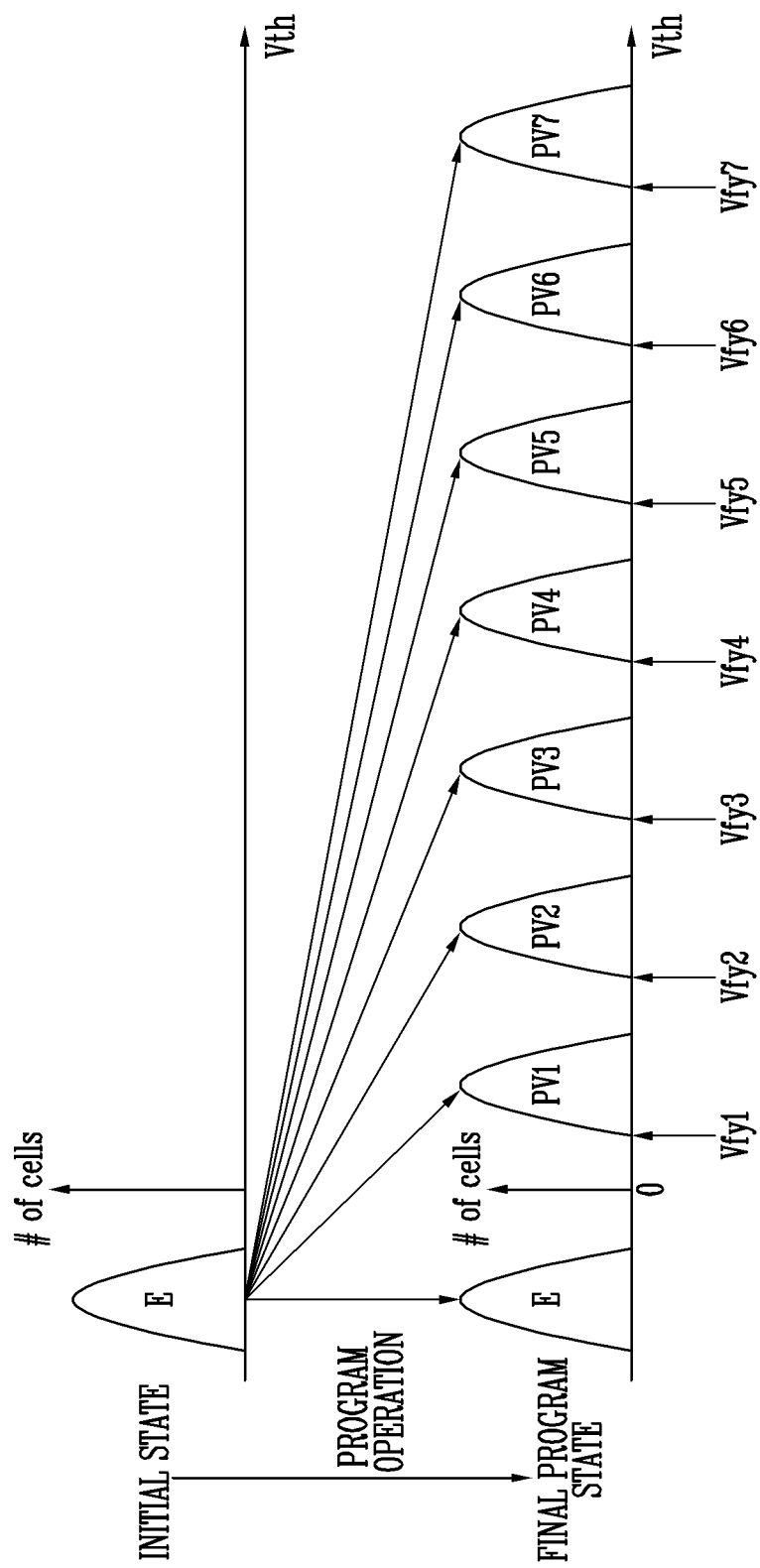
FIG. 2 is a diagram illustrating threshold voltage distributions of memory cells depending on a program operation of a memory device according to an embodiment of the present disclosure.

FIG. 2 is a diagram illustrating threshold voltage distributions of memory cells depending on a program operation of a memory device according to an embodiment of the present disclosure.

In FIG. 2, the horizontal axis of each graph indicates threshold voltages Vth of memory cells, and the vertical axis thereof indicates the number of memory cells (#of cells).

Referring to FIG. 2, the threshold voltage distribution of memory cells may change from an initial state to a final program state depending on the program operation.

In FIG. 2, a description is made on data that is programmed according to a triple-level cell (TLC) scheme in which one memory cell stores three bits of data.

The initial state may be the state in which a program operation is not performed and in which the threshold voltage distribution of the memory cells is in the erase state E.

The final program state may be the threshold voltage distribution of memory cells on which the program operation has been performed. Each of the memory cells on which the program operation has been performed may have a threshold voltage corresponding to one of a plurality of program states. For example, when data is programmed according to a TLC scheme in which three bits of data are stored in one memory cell, the plurality of program states may indicate the erase state E and first to seventh program states PV1 to PV7. In an embodiment, each of the memory cells on which the program operation has been performed may have a threshold voltage corresponding to one of the erase state E and the first to seventh program states PV1 to PV7. The threshold voltage of each memory cell in the initial state may be increased to the threshold voltage corresponding to one of the erase state E and the first to seventh program states PV1 to PV7 through the program operation.

Each memory cell may have one of the erase state E and the first to seventh program states PV1 to PV7 as a target program state. The target program state may be determined depending on the data to be stored in the corresponding memory cell. Each memory cell may have one of the erase state E and the first to seventh program states PV1 to PV7, which are the plurality of program states, as the target program state depending on the data to be stored. Each memory cell may have a threshold voltage corresponding to the target program state, among the plurality of program states, depending on the program operation.

Figure 3:
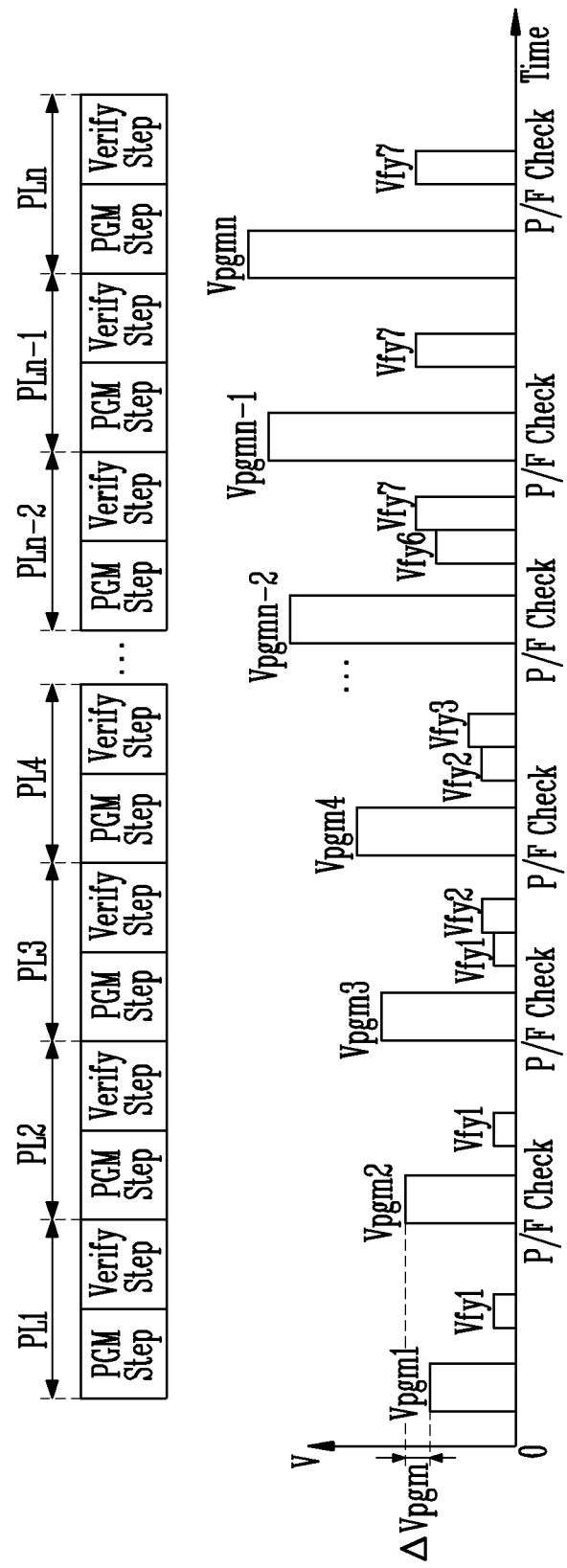
FIG. 3 is a diagram illustrating a program operation of a memory device according to an embodiment of the present disclosure.

FIG. 3 is a diagram illustrating a program operation of a memory device 100 according to an embodiment of the present disclosure.

In FIG. 3, the horizontal axis of a graph indicates time and the vertical axis thereof indicates voltage V applied to a word line. The voltage V applied to the word line may include a program voltage Vpgm and a verify voltage Vfy.

In FIG. 3, a description is made on data that is programmed according to a TLC scheme in which one memory cell stores three bits of data. However, the scope of the present disclosure is not limited thereto, and one memory cell may be programmed to store two bits of data or to store four or more bits of data.

Referring to FIG. 3, the memory device 100 may perform a program operation. The program operation may include a plurality of program loops PL1 to PLn. The memory device 100 may perform the plurality of program loops PL1 to PLn so that each of selected memory cells coupled to a selected word line has a threshold voltage corresponding to one of the plurality of program states. The one program state may be the target program state determined depending on the data to be stored in each of the selected memory cells.

Each of the plurality of program loops PL1 to PLn may include a program voltage apply operation (PGM Step) and a verify operation (Verify Step).

The program voltage apply operation (PGM Step) may be an operation of applying the program voltage to the selected word line coupled to the selected memory cells. In the program voltage apply operation (PGM Step), the threshold voltages of the selected memory cells may be increased by the program voltage.

The verify operation (Verify Step) may be an operation of applying the verify voltage to the selected word line coupled to the selected memory cells. The verify operation (Verify Step) may be an operation of identifying the threshold voltages of the memory cells increased by the program voltage apply operation. In detail, the verify operation (Verify Step) may be an operation of obtaining sensed data through a bit line coupled to memory cells when the verify voltage is applied to the word line coupled to the memory cells. Further, the verify operation (Verify Step) may be an operation of sensing data identified based on the threshold voltages of the memory cells. During the verify operation (Verify Step), when the threshold voltage of each of the memory cells is greater than the verify voltage, data corresponding to an off-cell may be sensed. During the verify operation (Verify Step), when the threshold voltage of each of the memory cells is less than the verify voltage, data corresponding to an on-cell may be sensed.

The memory device 100 may perform a pass/fail check operation (P/F Check) in parallel with the program voltage apply operation (PGM Step) while performing the program voltage apply operation. The pass/fail check operation (P/F Check) may be an operation of determining the result of the verify operation based on the data sensed by the verify operation. The pass/fail check operation (P/F Check) may be an operation of determining whether the result of the verify operation indicates 'pass' or 'fail' based on the result of comparing the number of on-cells identified by the verify operation, among the memory cells, with the reference number of on-cells. During the pass/fail check operation (P/F Check), when the number of on-cells is greater than the reference number of on-cells, the result of the verify operation may indicate 'fail'. During the pass/fail check operation (P/F Check), when the number of on-cells is less than the reference number of on-cells, the result of the verify operation may indicate 'pass'. Pass/fail result information indicating the result of the verify operation may be generated based on the result of comparing the number of on-cells with the reference number of on-cells during the pass/fail check operation (P/F Check). In an embodiment, the pass/fail check operation (P/F Check) may be performed under the control of the sub-processor 150 illustrated in FIG. 1.

In the first program loop PL1, after applying a first program voltage Vpgm1 to the selected word line coupled to the selected memory cells, the memory device 100 may apply a first verify voltage Vfy1 to the selected word line. In an embodiment, the main processor 140 may control the voltage generator 122 and the page buffer group 123 to apply the first program voltage Vpgm1 to the selected word line and thereafter apply the first verify voltage Vfy1 to the selected word line.

The first verify voltage Vfy1 may be a voltage used for a verify operation (Verify Step) on first memory cells having a first program state as a target program state, among the selected memory cells. The first verify voltage Vvfy1 may be a voltage corresponding to the first program state. During the verify operation (Verify Step), the memory device 100 may store data, indicating whether the threshold voltages of the first memory cells are greater than the first verify voltage Vfy1, in the page buffer group 123.

In the second program loop PL2, the memory device 100 may apply a second program voltage Vpgm2 to the selected word line. The second program voltage Vpgm2 may be a voltage greater than the first program voltage Vpgm1 by a unit program voltage ΔVpgm. The memory device 100 may perform the pass/fail check operation (P/F Check) for the first program state while applying the second program voltage Vpgm2 to the selected word line.

In detail, the sub-processor 150 may perform the pass/fail check operation (P/F Check) of comparing the number of on-cells having threshold voltages less than the first verify voltage Vfy1, among the first memory cells, with the reference number of on-cells while the main processor 140 controls the voltage of the selected word line to the magnitude of the second program voltage Vpgm2.

During the pass/fail check operation (P/F Check), when the number of on-cells is greater than the reference number of on-cells, the result of the pass/fail check operation may indicate 'fail'. When the pass/fail check operation (P/F Check) has failed, it may be determined that the threshold voltages of the first memory cells have not increased to threshold voltages corresponding to the first program state. In the second program loop PL2, the memory device 100 may apply the first verify voltage Vfy1 to the selected word line to identify the threshold voltages of the first memory cells increased by the second program voltage Vpgm2.

Thereafter, in the third program loop PL3, the memory device 100 may perform the pass/fail check operation (P/F Check) for the first program state while applying a third program voltage Vpgm3 to the selected word line. In the third program loop PL3, when the pass/fail check operation (P/F Check) for the first program state has failed, the first verify voltage Vfy1 and a second verify voltage Vfy2 may be applied to the selected word line. The second verify voltage Vfy2 may be a voltage for identifying the threshold voltages of second memory cells having a second program state as the target program state, among the selected memory cells.

In the fourth program loop PL4, the memory device 100 may perform the pass/fail check operation (P/F Check) for the first program state while applying a fourth program voltage Vpgm4 to the selected word line. In the fourth program loop PL4, when the number of on-cells identified using the first verify voltage Vfy1, among the first memory cells, is less than the reference number of on-cells, the result of the pass/fail check operation may indicate 'pass'. When the pass/fail check operation (P/F Check) has passed, it may be determined that the threshold voltages of the first memory cells are threshold voltages corresponding to the first program state. Thereafter, the memory device may apply the second verify voltage Vfy2 and a third verify voltage Vfy3 to the selected word line during the verify operation of the fourth program loop PL4.

The memory device 100 may perform the pass/fail check operation (P/F Check) on memory cells having second to seventh program states as target program states in the same manner as the pass/fail check operation (P/F Check) on the first memory cells having the first program state as the target program state. In an embodiment, when the pass/fail check operation (P/F Check) on the second memory cells having the second program state as the target program state, among the selected memory cells, has passed, the pass/fail check operation (P/F Check) on third memory cells having a third program state as the target program state may be performed.

In an embodiment, in the n-th program loop PLn, the memory device 100 may apply an n-th program voltage Vpgmn to the selected word line and thereafter apply a seventh verify voltage Vfy7 to the selected word line. After applying the seventh verify voltage Vfy7 to the selected word line, the memory device 100 may perform a pass/fail check operation (P/F Check) on the seventh memory cells having the seventh program state as the target program state. When the pass/fail check operation (P/F Check) for the seventh program state has passed, a subsequent program loop may not be performed. When the pass/fail check operation (P/F Check) for the seventh program state has passed, it may be determined that respective selected memory cells have threshold voltages corresponding to the target program states.

In an embodiment, the program voltage may be determined based on an incremental step pulse programming (ISPP) scheme. The magnitude of the program voltage may be stepwise increased or decreased as the program loops PL1 to PLn are repeated. The number of times that program voltages used in each program loop are applied, the levels of the program voltages, voltage apply times, etc. may be determined in various forms under the control of the memory controller 200.

Figure 4:
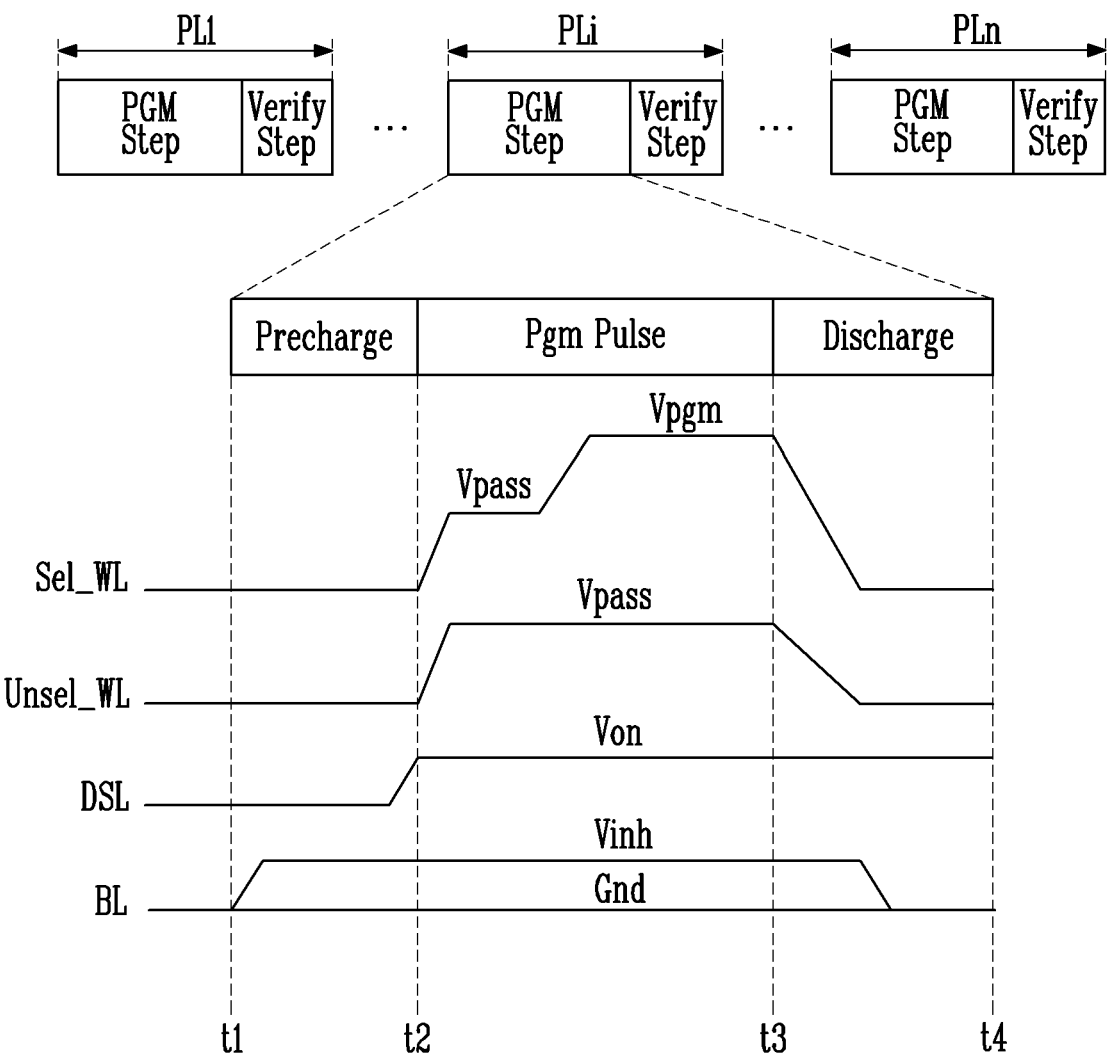
FIG. 4 is a diagram illustrating a program voltage apply operation of a memory device according to an embodiment of the present disclosure.

FIG. 4 is a diagram illustrating a program voltage apply operation of a memory device 100 according to an embodiment of the present disclosure.

Referring to FIG. 4, a program operation may include a plurality of program loops PL1 to PLn. Each of the plurality of program loops PL1 to PLn may include a program voltage apply operation (PGM Step) and a verify operation (Verify Step). The program voltage apply operation (PGM Step) may include a precharge operation (Precharge), a program pulse operation (Pgm Pulse), and a discharge operation (Discharge).

A period from time t1 to time t2 may be a period during which the precharge operation (Precharge) is performed. During the period from time t1 to time t2, the memory device 100 may apply a precharge voltage to a bit line BL. The precharge voltage may include a program-inhibit voltage or a program-enable voltage. During the period from time t1 to time t2, the memory device 100 may apply a program-inhibit voltage Vinh to a bit line coupled to a memory cell having a threshold voltage corresponding to a target program state. In an embodiment, the program-inhibit voltage Vinh may be a supply voltage. During the period from time t1 to time t2, the memory device 100 may apply a program-enable voltage to a bit line coupled to a memory cell that does not have a threshold voltage corresponding to the target program state. In an embodiment, the program-enable voltage may be a ground voltage Gnd.

A period from time t2 to time t3 may be a period during which the program pulse operation (Pgm Pulse) is performed. During the program pulse operation (Pgm Pulse), the threshold voltages of memory cells that do not have threshold voltages corresponding to the target program state, among the selected memory cells, may be increased. During the period from time t2 to time t3, the memory device 100 may apply a pass voltage Vpass to a selected word line Sel_WL and thereafter apply a program voltage Vpgm to the selected word line. In an embodiment, the program voltage Vpgm of FIG. 4 may be one of the first to n-th program voltages Vpgm1 to Vpgmn illustrated in FIG. 3.

During the period from time t2 to time t3, the memory device 100 may apply the pass voltage Vpass to unselected word lines Unsel_WL. The memory device 100 may apply a turn-on voltage Von to a drain select line DSL before applying the pass voltage Vpass to the selected word line Sel_WL and the unselected word lines Unsel_WL. The turn-on voltage Von may be a voltage greater than the threshold voltage of a drain select transistor coupled to the drain select line.

A period from time t3 to time t4 may be a period during which the discharge operation (Discharge) is performed. During the period from time t3 to time t4, the memory device 100 may discharge the voltages of the selected word line Sel_WL, the unselected word lines Unsel_WL, and the bit line BL. During the period from time t3 to time t4, the memory device 100 may apply a ground voltage to the selected word line Sel_WL and the unselected word lines Unsel_WL. During the period from time t3 to time t4, the memory device 100 may apply the ground voltage to the selected word line Sel_WL and the unselected word lines Unsel_WL and thereafter apply the ground voltage to the bit line BL.

Figure 5:
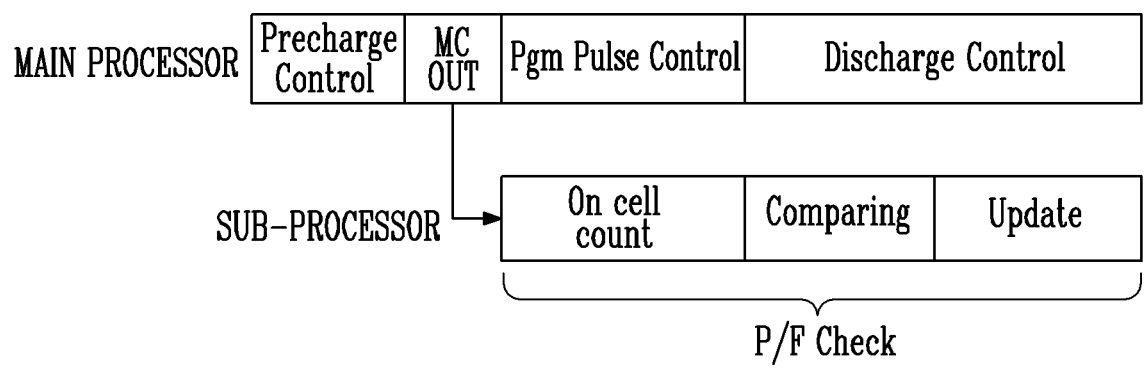
FIG. 5 is a diagram illustrating operations controlled by a main processor and a sub-processor according to an embodiment of the present disclosure.

FIG. 5 is a diagram illustrating operations controlled by a main processor 140 and a sub-processor 150 according to an embodiment of the present disclosure.

A description of FIG. 5 will be made with reference to FIGS. 1 and 4.

Referring to FIG. 5, the main processor 140 may control a precharge operation, a program pulse operation, and a discharge operation included in the program voltage apply operation of FIG. 4. The main processor 140 may control program-related voltages that are applied to word lines and bit lines during the program voltage apply operation.

During the precharge operation, the main processor 140 may control the voltage of the corresponding bit line to a program-inhibit voltage or a program-enable voltage. Thereafter, the main processor 140 may generate a control signal MC OUT for allowing the sub-processor 150 to perform an operation. In an embodiment, the control signal MC OUT generated by the main processor 140 may be a signal for instructing a pass/fail check operation to be performed. The main processor 140 may generate the control signal MC OUT and thereafter provide the control signal MC OUT to the sub-processor 150.

Thereafter, the main processor 140 may control the program pulse operation. During the program pulse operation, the main processor 140 may control the voltage of a selected word line to a program voltage and control the voltages of unselected word lines to a pass voltage. Also, the main processor 140 may control the discharge operation. During the discharge operation, the main processor 140 may control the voltages of the selected word line and the unselected word lines to a ground voltage and thereafter control the voltage of the bit line to the ground voltage.

In an embodiment, the sub-processor 150 may control the pass/fail check operation (P/F Check) in parallel with the program pulse operation and the discharge operation while the main processor 140 controls the program pulse operation and the discharge operation. The pass/fail check operation (P/F Check) may include an operation of counting the number of on-cells identified based on the threshold voltages of the memory cells (On Cell count), an operation of comparing the number of on-cells with the reference number of on-cells (Comparing), and an operation of updating data stored in latches included in the page buffer based on the result of comparing the number of on-cells with the reference number of on-cells (Update). The operation of updating the data stored in the latches will be described in detail later with reference to FIGS. 6 and 7.

In accordance with an embodiment of the present disclosure, during the program voltage apply operation, the main processor 140 may control the voltages of word lines and bit lines, and the sub-processor 150 may control a pass/fail check operation, thus enabling the program voltage apply operation and the pass/fail check operation to be performed in parallel.

Figure 6:
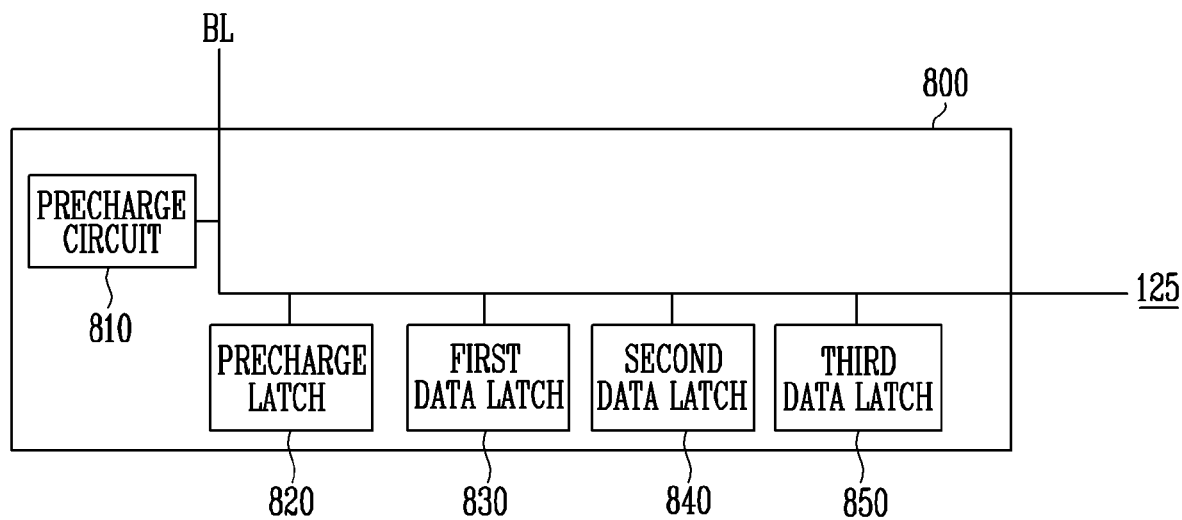
FIG. 6 is a diagram illustrating a page buffer according to an embodiment of the present disclosure.

FIG. 6 is a diagram illustrating a page buffer 800 according to an embodiment of the present disclosure.

The page buffer 800 illustrated in FIG. 6 may be one of first to m-th page buffers PB1 to PBm illustrated in FIG. 1.

Referring to FIG. 6, the page buffer 800 may include a precharge circuit 810, a precharge latch 820, a first data latch 830, a second data latch 840, and a third data latch 850. The page buffer 800 may be coupled to a bit line BL and the sensing circuit 125 of FIG. 1. The bit line BL may be coupled to a memory cell.

The precharge circuit 810 may be a circuit which controls the voltage of the bit line BL. In an embodiment, during a precharge operation, the precharge circuit 810 may increase the voltage of the bit line BL to a program-enable voltage or a program-inhibit voltage. In an embodiment, during a discharge operation, the precharge circuit 810 may decrease the voltage of the bit line BL to a ground voltage.

In an embodiment, during the precharge operation, the precharge latch 820 may be a latch which stores data used to determine the voltage to be applied to the bit line BL. The precharge circuit 810 may increase the voltage of the bit line BL to the program-enable voltage or the program-inhibit voltage based on the data stored in the precharge latch 820. In an embodiment, when data of a logic high level (1) is stored in the precharge latch 820, the precharge circuit 810 may increase the voltage of the bit line BL to the program-inhibit voltage during the precharge operation. In this case, the data of 1 stored in the precharge latch 820 may be data corresponding to the program-inhibit voltage. In an embodiment, when data of a logic low level (0) is stored in the precharge latch 820, the precharge circuit 810 may increase the voltage of the bit line BL to the program-enable voltage during the precharge operation. In this case, the data of 0 stored in the precharge latch 820 may be data corresponding to the program-enable voltage. In an embodiment, the precharge circuit 810 may control the voltage of the bit line BL under the control of the main processor 140.

In an embodiment, during a verify operation, the precharge latch 820 may store data sensed based on the threshold voltage of the memory cell. In an embodiment, the precharge latch 820 may store data corresponding to an off-cell when the threshold voltage of the memory cell is greater than a verify voltage. In an embodiment, the precharge latch 820 may store data corresponding to an on-cell when the threshold voltage of the memory cell is less than the verify voltage.

The first data latch 830, the second data latch 840, and the third data latch 850 may be latches in which data to be stored in the memory cell is temporarily stored. The number of data latches may be changed depending on the number of pieces of bit data stored in one memory cell. When data is programmed according to a TLC scheme in which one memory cell stores three bits of data, the number of data latches may be 3, as illustrated in FIG. 6.

One of the first data latch 830, the second data latch 840, and the third data latch 850 may store the result information of the pass/fail check operation. The one data latch may store data corresponding to pass/fail result information indicating 'pass', or data corresponding to the pass/fail result information indicating 'fail'.

Figure 7:
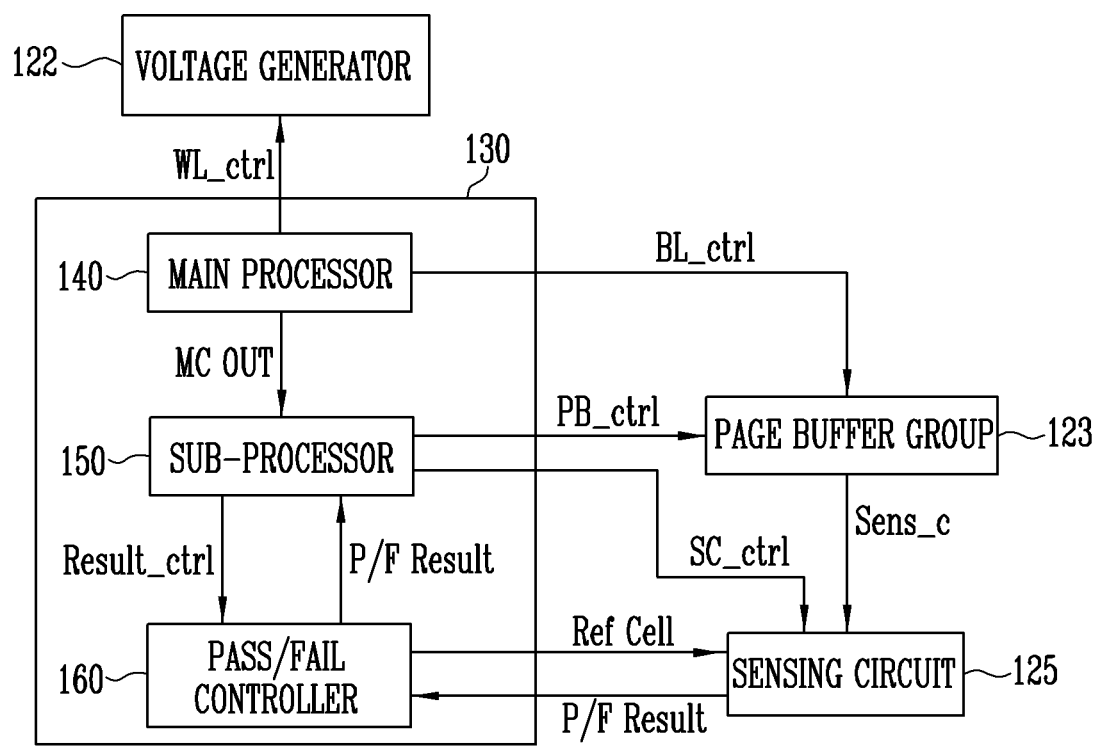
FIG. 7 is a diagram illustrating the operations of a main processor and a sub-processor during a program operation according to an embodiment of the present disclosure.

FIG. 7 is a diagram illustrating the operations of a main processor and a sub-processor during a program operation according to an embodiment of the present disclosure.

Referring to FIGS. 1, 6, and 7, the control logic 130 may control the peripheral circuit 120 to perform a program operation on memory cells. In detail, the control logic 130 may include a main processor 140, a sub-processor 150, and a pass/fail controller 160.

During a program operation, the main processor 140 may control program-related voltages that are applied to a word line and bit lines. The main processor 140 may control a voltage generator 122 which generates voltages to be applied to the word line, and a page buffer group 123 which applies voltages to the bit lines.

In an embodiment, during a precharge operation, the main processor 140 may control the page buffer group 123 to precharge the voltages of the bit lines (i.e., BL_ctrl). In detail, the main processor 140 may control a precharge circuit included in each of the page buffers of the page buffer group 123. Thereafter, the main processor 140 may generate a control signal MC OUT and then provide the control signal MC OUT to the sub-processor 150.

The main processor 140 may provide the control signal MC OUT to the sub-processor 150 and thereafter control a program pulse operation. During the program pulse operation, the main processor 140 may control the voltage generator 122 to apply a program voltage to the word line (i.e., WL_ctrl). After the program pulse operation is performed, the main processor 140 may control a discharge operation. During the discharge operation, the main processor 140 may control the voltage generator 122 and the page buffer group 123 to apply a ground voltage to the word line and the bit lines (i.e., WL_ctrl and PB_ctrl).

The sub-processor 150 may control a pass/fail check operation in response to the control signal MC OUT while the main processor 140 controls the program pulse operation and the discharge operation. The sub-processor 150 may perform the pass/fail check operation for a program state, corresponding to the control signal MC OUT provided by the main processor 140, among a plurality of program states. In an embodiment, in the case where the control signal provided by the main processor 140 activates port #1 of the sub-processor 150, the sub-processor 150 may perform a pass/fail check operation on first memory cells having a first program state as a target program state. The sub-processor 150 may control the page buffer group 123 to generate a sensing current Sens_c based on the number of on-cells identified using a first verify voltage, among the first memory cells (i.e., PB_ctrl).

In an embodiment, in the case where the control signal MC OUT provided by the main processor 140 activates port #2 of the sub-processor 150, the sub-processor 150 may perform a pass/fail check operation on second memory cells having a second program state as a target program state.

During the pass/fail check operation, the sub-processor 150 may control the page buffer group 123 to provide the sensing current Sens_c, corresponding to the data sensed based on the threshold voltages of the memory cells, to the sensing circuit 125. The data sensed based on the threshold voltages may be data corresponding to the number of on-cells identified using the verify voltage. The pass/fail controller 160 may provide the reference number of on-cells Ref Cell to the sensing circuit 125 in response to a control signal Result_ctrl output from the sub-processor 150. The sensing circuit 125 may generate a reference current corresponding to the reference number of on-cells Ref Cell received from the pass/fail controller 160 depending on the reference number of on-cells Ref Cell.

Thereafter, the sub-processor 150 may control the sensing circuit 125 to compare the number of on-cells corresponding to the sensing current Sens_c with the reference number of on-cells Ref Cell. In detail, the sensing circuit 125 may compare the sensing current Sens_c received from the page buffer group 123 with the reference current in response to a control signal SC_ctrl output from the sub-processor 150, and may provide, to the pass/fail controller 160, pass/fail result information P/F Result indicating the result of the comparison. In an embodiment, when the magnitude of the sensing current is greater than that of the reference current, the sensing circuit 125 may provide, to the pass/fail controller 160, pass/fail result information indicating 'fail'. In an embodiment, when the magnitude of the sensing current is less than that of the reference current, the sensing circuit 125 may provide, to the pass/fail controller 160, pass/fail result information indicating 'pass'. The pass/fail controller 160 may provide, to the sub-processor 150, the pass/fail result information P/F Result received from the sensing circuit 125.

The sub-processor 150 may update the data stored in the latches included in each of the page buffers of the page buffer group 123 based on the pass/fail result information P/F Result. In an embodiment, when the pass/fail result information indicating 'pass' is received, the sub-processor 150 may control the page buffer group 123 to store data corresponding to a program-inhibit voltage in the precharge latch. In an embodiment, when the pass/fail result information indicating 'fail' is received, the sub-processor 150 may control the page buffer group 123 to store data corresponding to a program-enable voltage in the precharge latch.

In an embodiment, the sub-processor 150 may control the page buffer group 123 to store the pass/fail result information P/F Result in one of the first to third data latches.

In accordance with embodiments of the present disclosure, while the main processor 140 controls program-related voltages to be applied to word lines and bit lines during a program pulse operation and a discharge operation, the sub-processor 150 may control the page buffer group 123 and the sensing circuit 125 to compare a sensing current Sens_c, corresponding to data sensed based on the threshold voltages of the memory cells, with a reference current and to update the data stored in latches included in the page buffer depending on pass/fail result information P/F Result determined based on the result of the comparison.

Figure 8:
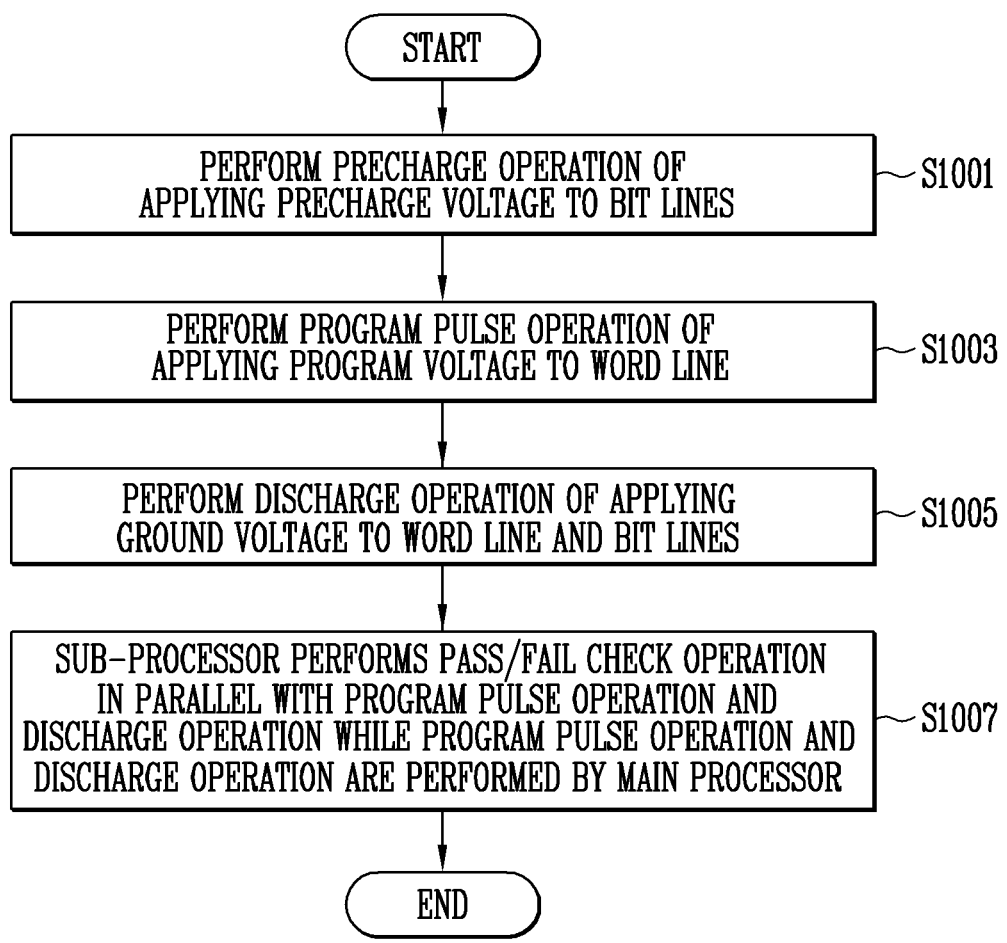
FIG. 8 is a flowchart illustrating a program operation controlled by a main processor and a sub-processor according to an embodiment of the present disclosure.

FIG. 8 is a flowchart illustrating a program operation controlled by a main processor 140 and a sub-processor 150 according to an embodiment of the present disclosure.

At operation S1001, the memory device 100 may perform a precharge operation of applying a precharge voltage to bit lines. The precharge voltage may include a program-enable voltage or a program-inhibit voltage. The precharge operation may be controlled by the main processor 140.

At operation S1003, the memory device 100 may perform a program pulse operation of applying a program voltage to a word line. The program pulse operation may be controlled by the main processor 140.

At operation S1005, the memory device 100 may perform a discharge operation of applying a ground voltage to the word line and the bit lines. The discharge operation may be controlled by the main processor 140.

At operation S1007, the memory device 100 may perform a pass/fail check operation in parallel with the program pulse operation and the discharge operation while performing the program pulse operation and the discharge operation. The program pulse operation and the discharge operation may be performed by the main processor 140, and the pass/fail check operation may be performed by the sub-processor 150.

In accordance with the present disclosure, there is provided a memory device that is capable of reducing the time required to perform a program operation and a method of operating the memory device.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all operations may be selectively performed or part of the operations may be omitted. In each embodiment, the operations may not be performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein and the following claims. Furthermore, the embodiments may be combined to form additional embodiments.

What is claimed is:

1. A memory device, comprising:
   memory cells coupled between a word line and bit lines;
   a main processor configured to control program-related voltages that are applied to the word line and the bit lines, and to generate a control signal after controlling a voltage to be applied to the bit lines and before controlling a program voltage to be applied to the word line;
   a page buffer configured to store data sensed based on threshold voltages of the memory cells;
   a sensing circuit configured to perform a pass/fail check operation of comparing a sensing current corresponding to the sensed data with a reference current; and
   a sub-processor configured to control the page buffer and the sensing circuit to perform the pass/fail check operation in response to the control signal, in parallel with control of the program-related voltages while the main processor controls the program-related voltages.

2. The memory device according to claim 1, wherein the sub-processor is configured to control the page buffer and the sensing circuit to perform the pass/fail check operation for a program state among a plurality of program states in parallel with control of the program-related voltages, in response to the control signal, the program state corresponds to the control signal provided by the main processor.

3. The memory device according to claim 1, wherein the main processor is configured to control, during a program pulse operation, a magnitude of a voltage of the word line to a magnitude of the program voltage and to control, during a discharge operation, the magnitudes of voltages of the word line and the bit lines to a magnitude of a ground voltage.

4. The memory device according to claim 3, further comprising:
   a pass/fail controller configured to provide, to the sub-processor, pass/fail result information, determined based on a result of comparing the sensing current with the reference current.

5. The memory device according to claim 4, wherein the page buffer comprises:
   a precharge latch configured to store data for determining a precharge voltage to be applied to the bit lines before the program pulse operation; and
   data latches configured to temporarily store data to be stored in the memory cells.

6. The memory device according to claim 5, wherein the sub-processor is configured to control the page buffer to store data corresponding to a program-inhibit voltage in the precharge latch in response to the pass/fail result information indicating pass.

7. The memory device according to claim 5, wherein the sub-processor is configured to control the page buffer to store data corresponding to a program-enable voltage in the precharge latch in response to the pass/fail result information indicating fail.

8. The memory device according to claim 5, wherein the sub-processor is configured to control the page buffer to store data corresponding to the pass/fail result information in one of the data latches.

9. A memory device, comprising:
   memory cells coupled between a word line and bit lines;
   a peripheral circuit configured to perform a program operation of increasing threshold voltages of the memory cells;
   a main processor configured to control, during the program operation, the peripheral circuit to apply program-related voltages to the word line and the bit lines, and to generate a control signal after controlling a voltage to be applied to the bit lines and before controlling a program voltage to be applied to the word line; and a sub-processor configured to control the peripheral circuit to perform a pass/fail check operation of comparing a number of on-cells with a reference number of on-cells in response to the control signal, in parallel with application of the program-related voltages while the program-related voltages are applied to the word line and the bit lines, the number of on-cells is identified by a verify operation, among the memory cells.

10. The memory device according to claim 9, wherein the program operation includes a program pulse operation of applying the program voltage to the word line and a discharge operation of applying a ground voltage to the bit lines.

11. The memory device according to claim 9, further comprising:
a pass/fail controller configured to provide, to the sub-processor, pass/fail result information, determined based on a result of comparing the number of on-cells with the reference number of on-cells.

12. The memory device according to claim 9, wherein the peripheral circuit comprises:
a precharge latch configured to store data corresponding to a program-inhibit voltage or a program-enable voltage to be applied to the bit lines; and
data latches configured to temporarily store data to be stored in the memory cells.

13. The memory device according to claim 12, wherein the sub-processor is configured to control the peripheral circuit to update data stored in the precharge latch depending on pass/fail result information, while the program-related voltages are applied to the word line and the bit lines, the pass/fail result information is determined based on a result of comparing the number of on-cells with the reference number of on-cells.

14. The memory device according to claim 12, wherein the sub-processor is configured to control the peripheral circuit to store pass/fail result information in one of the data latches while the program-related voltages are applied to the word line and the bit lines, the pass/fail result information is determined based on a result of comparing the number of on-cells with the reference number of on-cells.

15. A method of operating a memory device, comprising:
generating a control signal after applying a voltage to bit lines coupled to memory cells;
performing a program pulse operation of applying a program voltage to a word line coupled to the memory cells after generating the control signal;
performing a discharge operation of applying a ground voltage to the word line and the bit lines coupled to the memory cells; and
performing, by a sub-processor, a pass/fail check operation of comparing a number of on-cells identified by a verify operation, among the memory cells, with a reference number of on-cells, in response to the control signal, in parallel with the program pulse operation and the discharge operation while the program pulse operation and the discharge operation are performed by a main processor.

16. The method according to claim 15, wherein performing the pass/fail check operation comprises:
generating pass/fail result information based on a result of comparing the number of on-cells with the reference number of on-cells.

17. The method according to claim 16, further comprising:
performing a precharge operation of applying a precharge voltage to the bit lines before the program pulse operation is performed.

18. The method according to claim 17, further comprising:
updating data used to determine a magnitude of the precharge voltage to data corresponding to a program-inhibit voltage in response to the pass/fail result information indicating pass.

19. The method according to claim 17, further comprising:
updating data used to determine a magnitude of the precharge voltage to data corresponding to a program-enable voltage in response to the pass/fail result information indicating fail.

* * * * *